United States Patent
Hartley et al.

(10) Patent No.: US 12,038,347 B2
(45) Date of Patent: Jul. 16, 2024

(54) METHOD AND APPARATUS FOR STEADY STATE AND TRANSIENT GENERATION OF $NO_2$ AND NO FOR USE WITH BURNER-BASED EXHAUST REPLICATION SYSTEMS

(71) Applicant: Southwest Research Institute, San Antonio, TX (US)

(72) Inventors: Ryan C. Hartley, Lexington, NC (US); Robert T. Henderson, San Antonio, TX (US); Cary A. Henry, Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 5 days.

(21) Appl. No.: 17/302,889

(22) Filed: May 14, 2021

(65) Prior Publication Data

US 2022/0364956 A1 Nov. 17, 2022

(51) Int. Cl.
*G01M 15/10* (2006.01)
*F01N 3/20* (2006.01)
*F01N 11/00* (2006.01)

(52) U.S. Cl.
CPC .............. *G01M 15/10* (2013.01); *F01N 3/206* (2013.01); *F01N 11/00* (2013.01); *F01N 2610/00* (2013.01)

(58) Field of Classification Search
CPC ...... F01N 11/00; F01N 2610/00; F01N 3/206; F01N 2550/02; G01M 15/10; G01M 15/102; Y02A 50/20
See application file for complete search history.

(56) References Cited

U.S. PATENT DOCUMENTS

2021/0172835 A1\* 6/2021 Hartley ............... G01M 15/102

FOREIGN PATENT DOCUMENTS

JP 09094437 \* 4/1997

OTHER PUBLICATIONS

Ellis, W.R.; Murray, R.C., The thermal decomposition of anhydrous nitric acid vapour. Journal of Applied Chemistry 1953, 3 (7), 318-322.

\* cited by examiner

*Primary Examiner* — Phutthiwat Wongwian
*Assistant Examiner* — Diem T Tran
(74) *Attorney, Agent, or Firm* — Grossman, Tucker, Perreault & Pfleger, PLLC (57) ABSTRACT

This invention relates to exhaust replication systems and methods, such as systems for testing automotive exhaust aftertreatment devices. More particularly, methods for steady state and transient generation and flow of $NO_2$ and/or NO from a fluid such as nitric acid for introduction into the burner-based exhaust replication system.

9 Claims, 9 Drawing Sheets

METHOD AND APPARATUS FOR STEADY STATE AND TRANSIENT GENERATION OF NO₂ AND NO FOR USE WITH BURNER-BASED EXHAUST REPLICATION SYSTEMS

FIELD

This invention relates to exhaust replication systems and methods, such as systems for testing automotive exhaust aftertreatment devices. More particularly, methods for steady state and transient generation and flow of $NO_2$ and/or NO from a fluid such as nitric acid for introduction into the burner-based exhaust replication system.

BACKGROUND

In today's automotive vehicles, exhaust aftertreatment devices remove potentially harmful gases and particulates from the engines' exhaust. Examples of these are the catalytic converters common on gasoline vehicles as well as diesel oxidation catalysts, diesel particulate filters, and selective catalytic reduction (SCR) catalysts.

The desire for reduced automotive emissions has led to the need for test systems that rapidly and cost effectively evaluate and age exhaust aftertreatment devices. This allows both performance and durability to be tested.

Conventionally, tests of exhaust aftertreatment devices have been conducted on engine test stands. However, burner-based systems are also used. An example of a burner-based system is the Exhaust Component Transient Operation Laboratory (ECTO-Lab™) developed by Southwest Research Institute.

To test the various exhaust aftertreatment devices in use for today's engine-driven vehicles, a burner-based test system must be capable of replicating the exhaust produced by the engines. Two pollutants of interest are NO (nitric oxide) and $NO_2$ (nitrogen dioxide).

Methods and systems are therefore still needed to provide a source of NO and/or $NO_2$ along with techniques to provide steady state and transient generation and flow of such compounds for introduction into the exhaust streams of exhaust replication systems.

SUMMARY

A burner-based exhaust test system having an exhaust line that carries an exhaust as an output of the test system, comprising a decomposition reactor operable to receive a fluid that decomposes to generate $NO_2$ including a decomposition reactor output line that splits into a first and second line and at least one of the first and second lines include a mass flow measurement device and at least one of the first and second lines include a flow regulating valve. At least one of the first and second lines is an open exhaust line and at least one of the lines is in communication with the burner-based exhaust test system. The system operates to alter the injection rate of $NO_2$ into the burner-based exhaust test system.

A burner-based exhaust test system having an exhaust line that carries an exhaust as an output of the test system comprising a decomposition reactor operable to receive a fluid that decomposes to generate $NO_2$ including a $NO_2$ accumulator operable to store generated $NO_2$ wherein the accumulator includes first and second output lines. The first output line is in communication with a $NO_2$ reduction reactor operable to produce NO for delivery into the burner-based exhaust test system. The second output line is in communication with the burner-based exhaust test system and the system operates to control the injection of $NO_2$ and NO into the exhaust test system.

A method of using a burner-based exhaust test system having an exhaust line that carries an exhaust as an output of the test system, comprising providing a decomposition reactor operable to receive a fluid that decomposes to generate $NO_2$ including a decomposition reactor output line that splits into a first and second line and at least one of the first and second lines include a mass flow measurement device and at least one of the first and second lines include a flow regulating valve. At least one of the first and second lines is an open exhaust line and at least one of the lines is in communication with the burner-based exhaust test system. One may then inject $NO_2$ into the burner-based exhaust test system at a selected injection rate.

A method of using a burner-based exhaust test system having an exhaust line that carries an exhaust as an output of the test system comprising providing a decomposition reactor operable to receive a fluid that decomposes to generate $NO_2$ including a $NO_2$ accumulator operable to store generated $NO_2$ wherein the accumulator includes first and second output lines and wherein the first output line is in communication with a $NO_2$ reduction reactor operable to produce NO for delivery into the burner-based exhaust test system and the second output line is in communication with the burner-based exhaust test system. One may then inject $NO_2$ and/or NO into the burner-based exhaust test system.

DETAILED DESCRIPTION OF PREFERRED EMBODIMENTS

The following description is directed to a method and apparatus for replicating automotive exhaust gas in a burner-based test system. The method produces $NO_2$ (nitrogen dioxide), a gaseous air pollutant composed of nitrogen and oxygen and one of a group of related gases called nitrogen oxides, or NOx. The method provides for accurate generation and control of $NO_2$ in a burner-based test system. This allows the test system to generate a desired $NO_2$:NOx ratio within its exhaust stream, where NOx is reference to the combined amount of NO and $NO_2$. Typically, the method is used to generate $NO_2$ for testing automotive exhaust aftertreatment devices, but it could be used for any "exhaust replication system" in which $NO_2$ is needed as a component to replicate engine exhaust.

For purposes of example, the $NO_2$ production method is described in the context of use with a burner-based ECTO-Lab test system. As described in the Background, the ECTO-Lab test system is for aftertreatment testing, accommodating full-sized catalysts from light-duty gasoline engines to large, heavy-duty diesel and natural gas engines. It is a multi-fueled, burner-based system designed to replicate exhaust conditions generated by internal combustion engines. The ECTO-Lab system can simulate lean and stoichiometric exhaust gas conditions using gasoline, diesel, natural gas, or propane fuels. It meets testing requirements for a wide range of full-size aftertreatment catalysts and devices. However, the present invention may be used with any burner-based automotive test system that requires $NO_2$ and/or NO in its exhaust stream.

Figure 1:
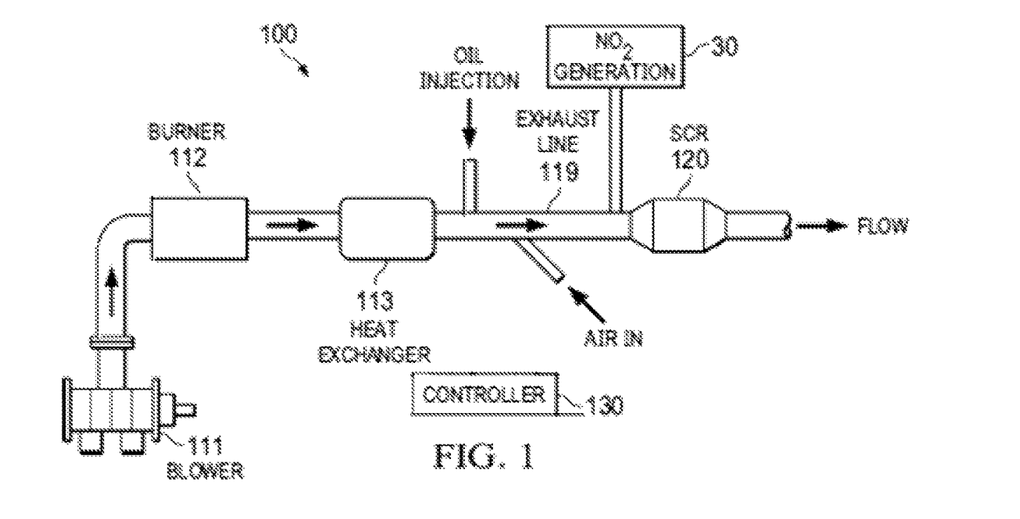
FIG. 1 illustrates a burner-based test system for testing automotive exhaust aftertreatment devices, having a $NO_2$ generation system in accordance with the invention.

FIG. 1 illustrates a burner-based test system suitable for use with the present invention. System 100 is designed to replicate engine exhaust in terms of temperature and flow rate. As described below, system 100 has a $NO_2$ generation system 30, which is capable of providing a desired amount of $NO_2$ into the exhaust stream.

As stated in the Background, an example of such a system is the ECTO-Lab™ system, developed by Southwest Research Institute. Exhaust gas conditions are preferably generated through computer control and allow various combinations of flow, temperature, exhaust component concentrations.

A burner 112 combusts a hydrocarbon fuel, such as gasoline or natural gas, thereby producing an exhaust stream. A wide range of air-fuel ratios may be combusted. A blower 111 is used to produce a desired air flow into burner 112.

A heat exchanger 113 allows the exhaust gas temperature delivered from system 100 to be controlled. A typical range of outlet temperatures for system 100 is 400 to 1200 degrees centigrade.

An exhaust line 119 delivers the exhaust to an exhaust after-treatment device 120 that is being tested. An oil injector allows oil to injected into the exhaust line 119. This feature of system 100 is significant for aging various aftertreatment devices. A secondary air injector allows an amount of fresh air to be injected into the exhaust line 119.

In the example of this description, device 120 is a selective catalytic reduction (SCR) catalyst. SCR catalyst testing is of particular interest because of the need to achieve a desired $NO_2$:NOx ratio at the front face of the catalyst to simulate its use in a vehicle.

A controller 130 allows system 100 to implement programmable aging cycles. Parameters affecting the exhaust flow and content, such as exhaust temperature, flow rate, combustion air-fuel ratio, secondary air injection, and oil injection, may be varied. Although not shown in FIG. 1, system 100 has appropriate valves, injectors, and other mechanisms for achieving these controls. Input lines for oil injection and secondary air injection are shown in FIG. 1, although not necessarily used for purposes of $NO_2$ generation.

Controller 130 may incorporate the various control features described below, or those features may be implemented with separate controllers.

Most systems 100 have a modular design, which allows components to be added to the base burner and heat exchanger. The system 100 can be modified as desired to simulate stoichiometric or lean-burn multi-fuel engines, as well as to replicate full transient exhaust traces.

Figure 2:
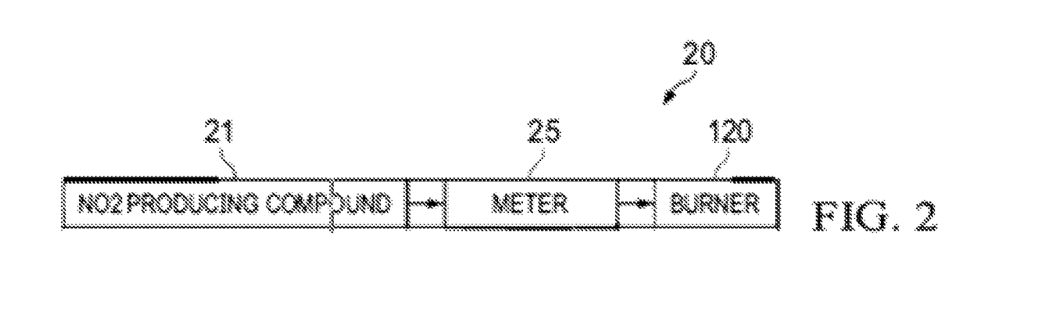
FIG. 2 illustrates a first embodiment of an $NO_2$ generation system for producing $NO_2$ in the exhaust stream of the test system of FIG. 1.

FIG. 2 illustrates a first embodiment of an $NO_2$ generation system for producing $NO_2$ in an exhaust stream of test system 100. In this embodiment, $NO_2$ is produced by combustion of burner 112.

A reservoir 21 contains a fluid that produces $NO_2$ when that fluid combusts. Using meter 25, a desired amount of this fluid is metered into burner 112, where it combusts along with the "normal" burner fuel. The $NO_2$ producing fluid may be injected directly into the combustion zone of the burner.

An example of an $NO_2$-producing fluid is nitric acid. Nitric acid ($HNO_3$) is known to decompose thermally or by light according to the equation $4HNO_3 \rightarrow 2H_2O+4NO_2+O_2$. The nitric acid may be used in an aqueous form to reduce any caustic effects on equipment and personnel.

The decomposition extent and products may require precise temperature and control, both of which can be integrated into a closed-loop control scheme of system 100.

Figure 3:
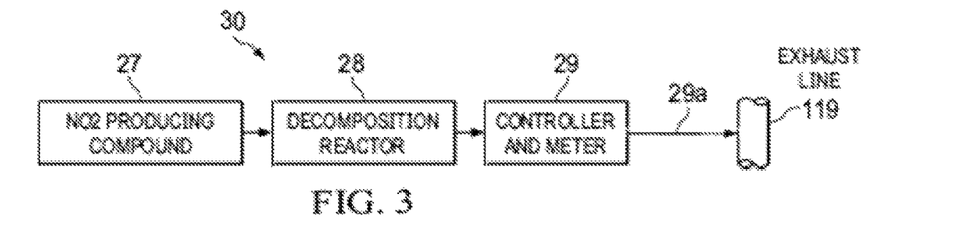
FIG. 3 illustrates a second embodiment of an $NO_2$ generation system for producing $NO_2$ in an exhaust stream of the test system of FIG. 1.

FIG. 3 illustrates a second embodiment of an $NO_2$ generation system 30 for producing $NO_2$ in an exhaust stream of test system 100. In this method, $NO_2$ is produced externally to system 100 and introduced into the exhaust stream of system 100, directly into exhaust line 119.

A reservoir 27 stores an $NO_2$-producing fluid, such as nitric acid. The $NO_2$-producing fluid is delivered to a decomposition reactor 28 where it is heated to a desired temperature for a desired length of time to produce $NO_2$. To increase the reaction rate, a decomposition catalyst, may be used within reactor 28. An inert surface area promoter, such as glass or ceramic raschig rings, may be additionally or alternatively used.

A controller 29 has a meter, such as a mass flow meter, to meter the flow of gaseous $NO_2$ into the exhaust line 119 of system 100. The controller 29 may be installed on either side of reactor 28. Controller 29 also controls the temperature of the reactor 28. Control of the residence time of the $NO_2$-producing fluid within reactor 28 may be controlled by metering the flow rate into reactor 28 as described below.

The $NO_2$ injection point may be anywhere downstream of burner 112 and upstream the aftertreatment device 120. Typically, the injection point will be a sufficient distance in front of device 120 to ensure mixing and therefore uniformity of $NO_2$ within the exhaust mixture. If desired, the line 29a carrying the $NO_2$ to the exhaust line 119 may be heated.

Figure 4:
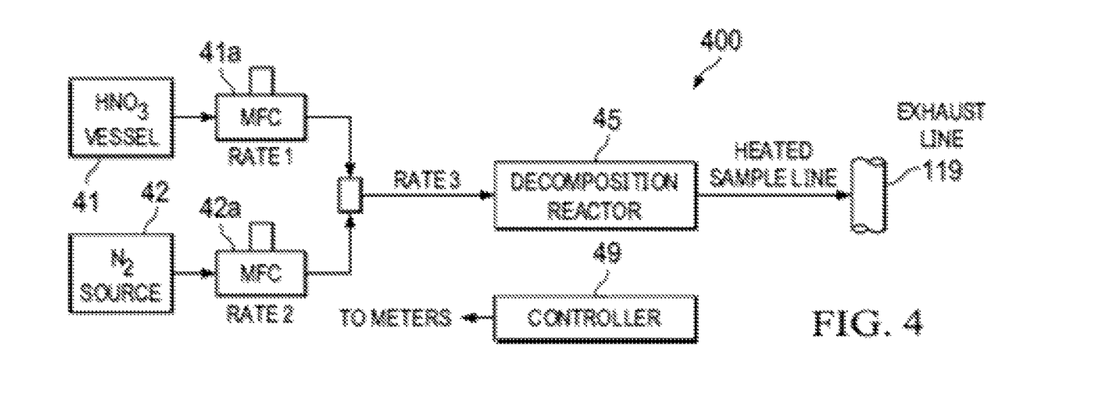
FIG. 4 illustrates a variation of the $NO_2$ generation system of FIG. 3.

FIG. 4 illustrates a variation of the $NO_2$ generation system of FIG. 3. In system 400, $HNO_3$ and nitrogen ($N_2$) are stored in respective reservoirs 41 and 42, respectively. The $N_2$ is used as a carrier gas to help achieve steady and repeatable $NO_2$ formation within decomposition reactor 45. Carrier gases other than nitrogen may be used, such as ambient air or carbon dioxide. Other suitable carrier gases are any non-radioactive noble gas, such as helium, neon, argon, krypton, and xenon.

Both fluids have an associated meter, such as a mass flow controllers (MFC) 41a and 42a, which meter the respective fluids to decomposition reactor 45. Reactor 45 comprises a heater and possibly a reduction catalyst and surface area promoter. As with system 30, a controller 49 controls the temperature of reactor 45. It also controls meters 41a and 41b to control the residence time of $HNO_3$ and $N_2$ within the reactor.

Figure 5:
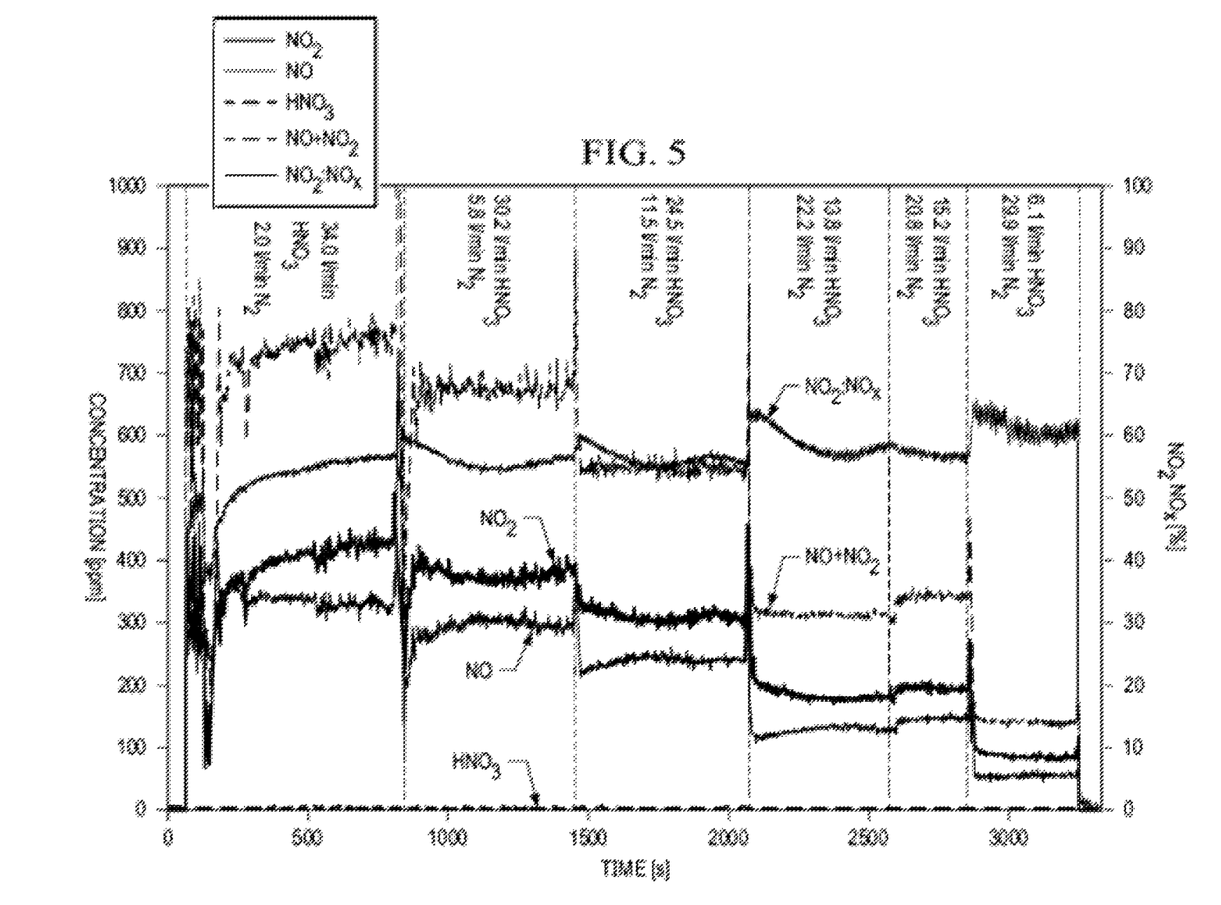
FIGS. 5 and 6 illustrate how the $NO_2$ generation system of FIG. 4 may be used to control $NO_2$ generation by varying the flow rates of $N_2$ and $HNO_3$ into the decomposition reactor.

FIG. 5 illustrates how system 400 may be used to control $NO_2$ generation by varying the flow rates of $N_2$ and $HNO_3$ into reactor 45. Using meters 41a and 42b, the individual flow rates may be varied. In example experimentation, the sum of the $HNO_3$ and $N_2$ flow rates were maintained at a constant value of 36.0 l/min, and the individual flow rates were varied. The decomposition reactor 45 was maintained at a temperature of 550° C. Under these conditions, all nitric acid is decomposed and the $NO_2$:NOx value was maintained between about 55-62%. Based on this the $NO_2$:NOx value may be tuned from about 5-62% by using nitromethane/nitroethane as the source of NO and $HNO_3$ as the source of $NO_2$.

Figure 6:
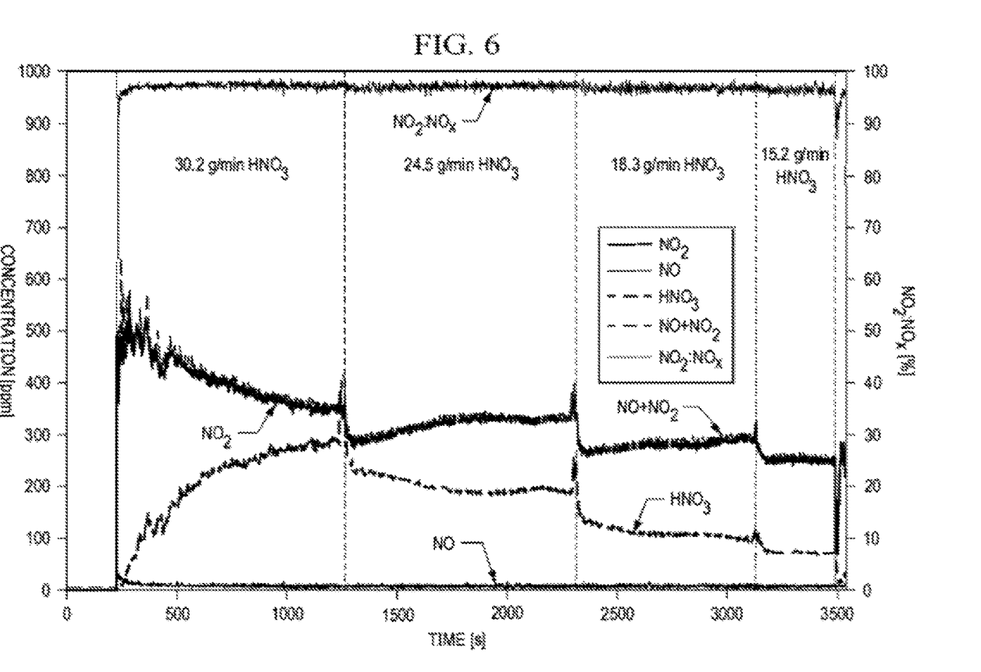

FIG. 6 illustrates how decomposition is affected by lower temperatures of decomposition reactor 45. In the example experiment of FIG. 6, the decomposition reactor 45 was reduced to a temperature of 400° C. As in FIG. 5, 20 a constant total flow of the sum of $HNO_3$ and $N_2$ was maintained at 36.0 l/min, and the $HNO_3$ and $N_2$ flow rates were individually varied. By reducing the temperature of the decomposition reactor 45, the $NO_2$:NOx ratio can be increased to a value of >95%. The $NO_2$ and $NO+NO_2$ plots overlap. At lower temperatures, the $NO_2$:NOx ratio has a larger controllable range into the exhaust stream.

Figure 7:
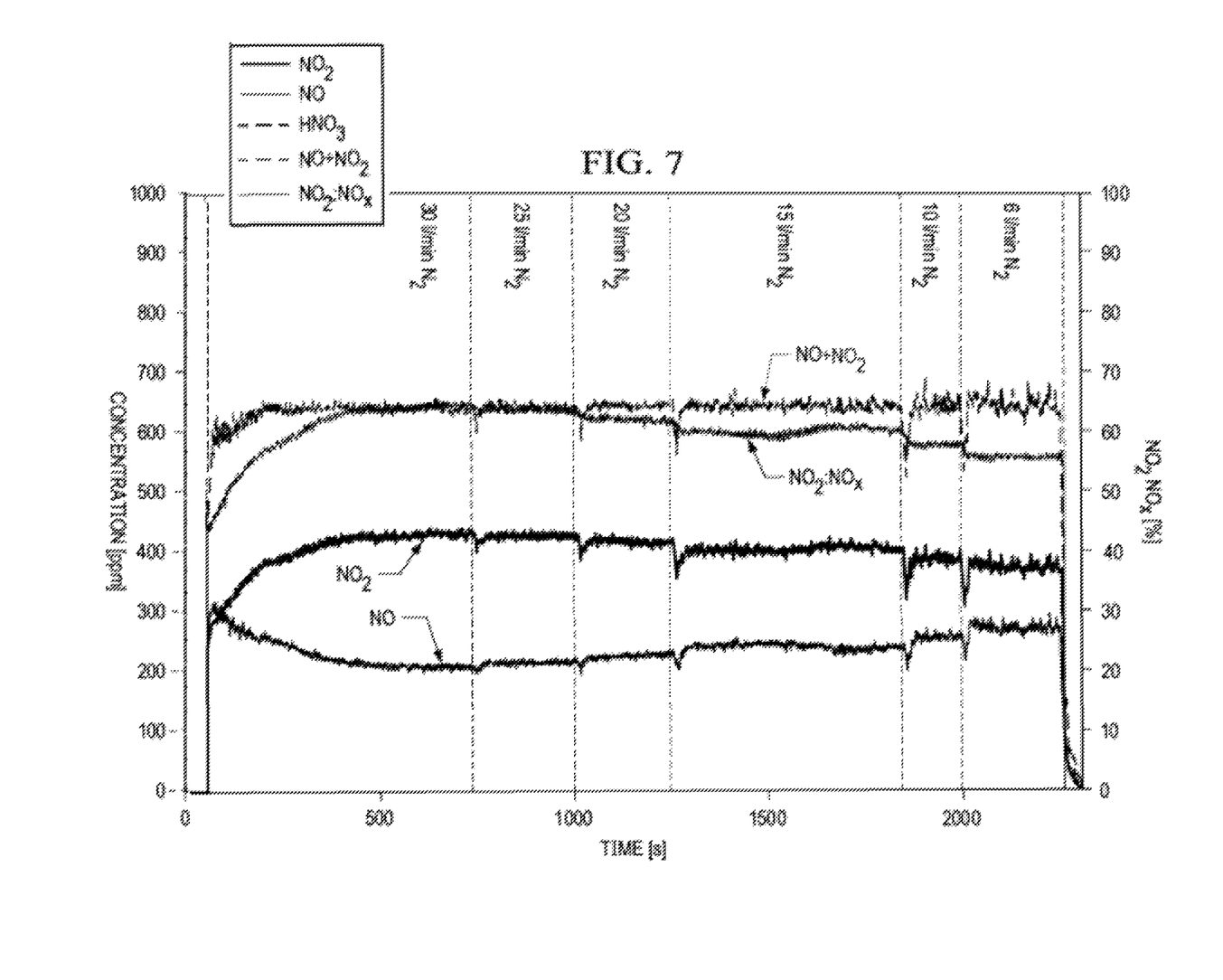
FIG. 7 illustrates how the $NO_2$ generation system of FIG. 4 may be used to control $NO_2$ generation by varying the residence time of $HNO_3$ in the decomposition reactor.

FIG. 7 illustrates how decomposition is affected by the residence time of $HNO_3$ within the decomposition reactor 45. In this example experiment, the flow rate of $HNO_3$ was kept constant at 30.2 g/min and the $N_2$ flow rate was progressively increased. The decomposition reactor 45 was maintained at 550° C. By increasing the $N_2$ flow rate in such a manner, the residence time of $HNO_3$ within the decomposition reactor 45 was progressively decreased and the effect on the $NO_2$:NOx was quantified.

Figure 8:
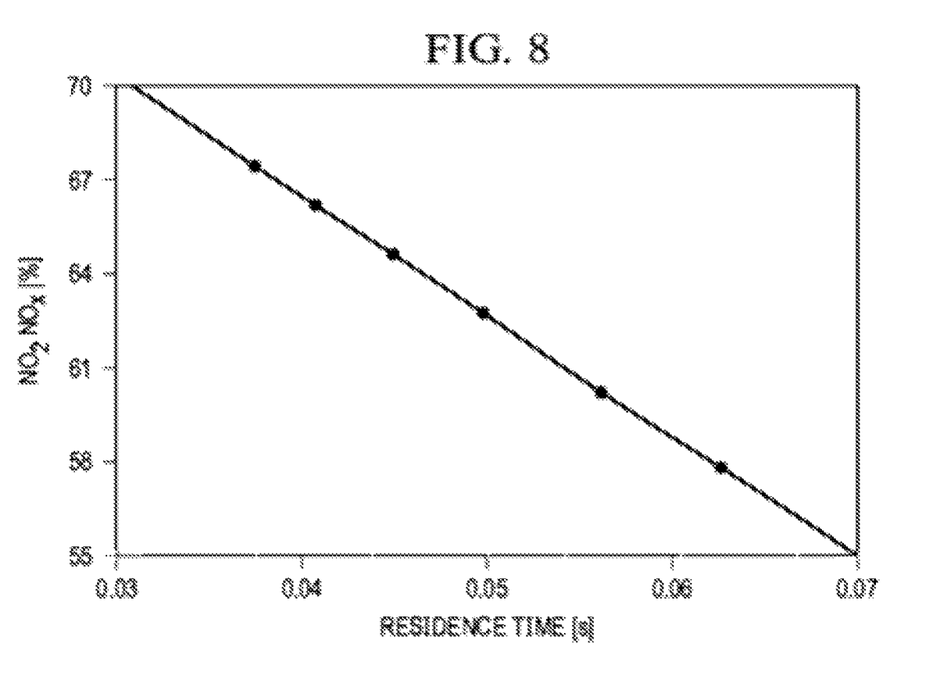
FIG. 8 illustrates the $NO_2$:NOx ratio produced by the $NO_2$ generation system of FIG. 4 as a function of residence time within the decomposition reactor.

FIG. 8 illustrates the $NO_2$:NOx ratio produced by the $NO_2$ generation system of FIG. 4 as a function of residence time within decomposition reactor 45. From these data, it is apparent that an increase in residence time of $HNO_3$ within decomposition reactor 45 results in a reduced $NO_2$:NOx ratio when the decomposition reactor was maintained at 550° C.

The above-described data demonstrate that an appropriate decomposition reactor temperature and $HNO_3$ residence time can be selected if a high $NO_2$:NOx ratio is to be achieved while mitigating $HNO_3$ breakthrough.

Decomposition of nitric acid to $NO_2$ and its other products may reach completion (100% conversion) at temperatures as low as 200° C. and 1 atm. If nitric acid is given sufficient decomposition time, complete decomposition may be possible at temperatures as low as 120 degrees C.

Using the above-described methods, the test system is capable of achieving a desired $NO_2$:NOx ratio at the front face of an exhaust aftertreatment device, such as an SCR catalyst. No oxidation catalyst is needed.

It should next be noted that the system described herein is preferably suitable for steady-state operation, but transient or variable control would be even more preferable. This is believed to be due to the relatively substantial NOx rise time duration, which is measured from the start of $HNO_3$ dosing until a relatively steady-state NOx has been achieved. To therefore preferably enhance transient or variable flow operation, the decomposition of $HNO_3$ and injection into the exhaust stream for analysis is now preferably decoupled.

Figure 9:
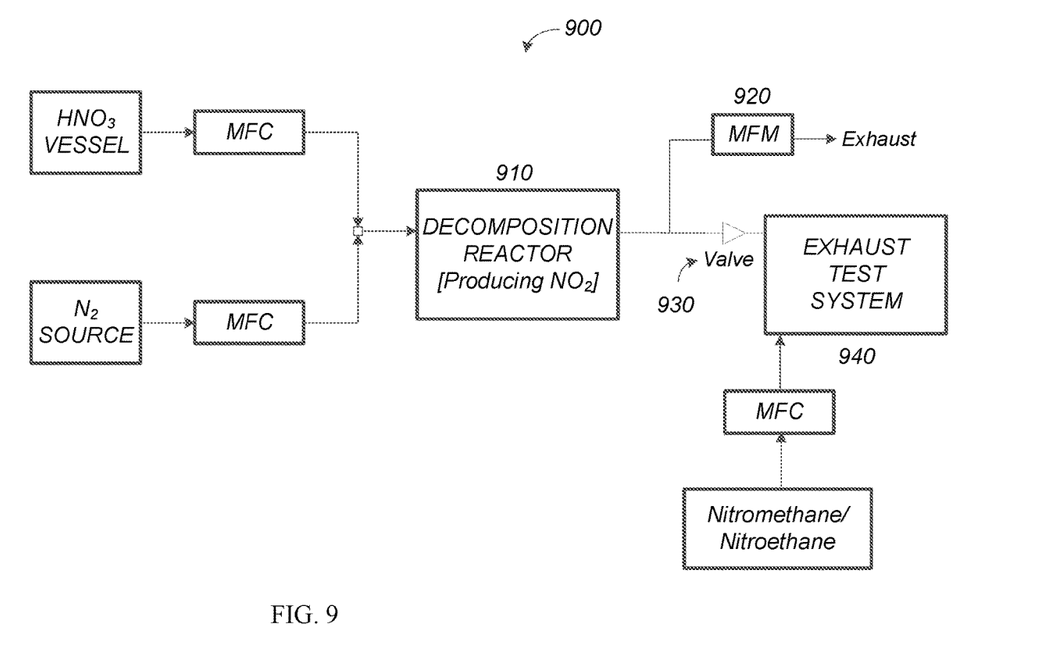
FIG. 9 illustrates a transient nitric acid decomposition system.

Reference is therefore initially made to FIG. 9. As can be seen, the illustrated apparatus or system 900 splits the outgoing flow from the decomposition reactor 910. As noted above, the decomposition reactor herein can produce $NO_2$ from the decomposition of a fluid, such as nitric acid and stream such $NO_2$ to an output line or conduit. Such decomposition reactor output line conduit then is split into a first and second line, where a mass flow meter (MFM) 920 is positioned on one of the split lines which simply exhausts. A valve 930 is then positioned on the second split line, such as the line that is in communication with the exhaust test system 940 to regulate $NO_2$ flow. This arrangement may also be altered, wherein the MFM 920 is positioned at the location of the valve 930 and the valve is positioned at the location of the MFM 920.

Accordingly, this control scheme therefore uses mass flow meter (MFM) feedback to adjust the position of the valve 930 which in turn provides the ability to alter the injection rate of $NO_2$ into the exhaust test system 940, or more particularly, to an exhaust stream output of the exhaust test system. As alluded to above, one may place the mass flow measurement (MFM) device on either one or both of the split lines or conduit emerging from the decomposition reactor and a flow regulating valve on either of the split lines which operates to control the injection rate of $NO_2$ into the exhaust test system 940. Preferably, the injection rate of $NO_2$ into the exhaust test system 940 may be in the range of 0.1 liters/minute to 40.0 liters/minute. In addition, as also illustrated in FIG. 9, one may introduce directly into the exhaust test system 940 nitromethane or nitroethane through a mass flow controller (MFC), which controls the flow rate of such compounds, which compounds can then combust in the exhaust test system 940 to provide a source of NO.

Figure 10:
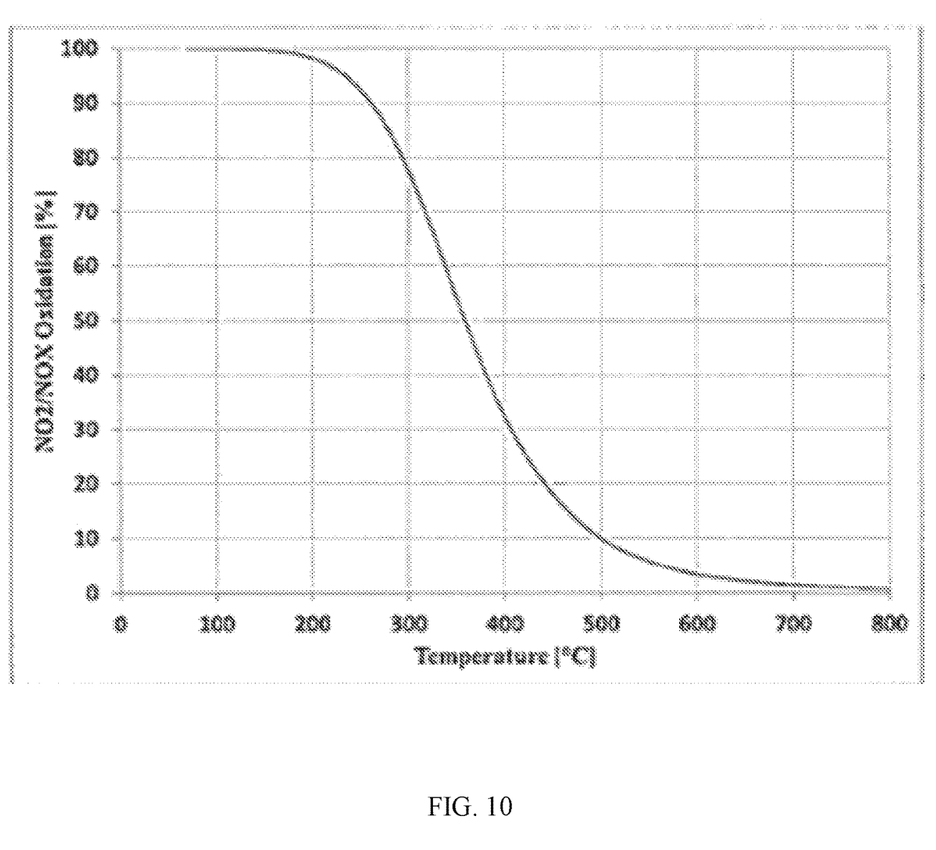
FIG. 10 illustrates the thermodynamic equilibrium curve of a mixture of NO and $NO_2$ in the presence of 15% $O_2$.

It is next noted herein that control of the $NO_2$:NOx ratio herein, has as noted relied upon the combustion of nitromethane/nitroethane. It is therefore now disclosed that both NO and $NO_2$ can be produced by the decomposition of $HNO_3$, thereby eliminating the need for a separate source of NO. Reference is made to FIG. 10 which provides the thermodynamic equilibrium curve of a mixture of NO and $NO_2$ in the presence of 15% $O_2$. At temperatures of <250 degrees C. the mixture is comprised of over 95% $NO_2$ while at temperatures>600 degrees C., the mixture is nearly all NO. Accordingly, by leveraging the thermodynamic equilibrium of NOx mixtures, a portion of the $NO_2$ generated by $HNO_3$ may now be reduced to NO.

Figure 11:
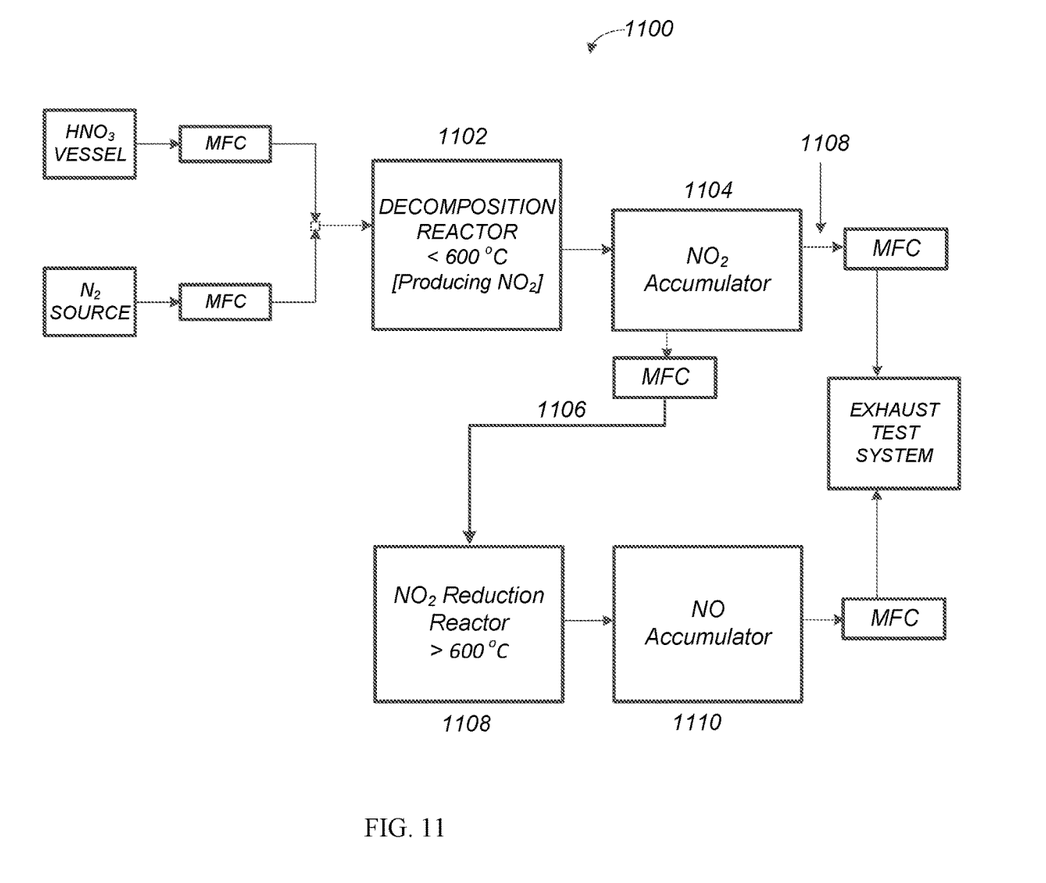
FIG. 11 illustrates a configuration for NO and/or $NO_2$ generation using nitric acid as the single precursor.

Reference is made to FIG. 11 which illustrates a system configuration 1100 for the generation of both $NO_2$ and NO utilizing a single precursor such as nitric acid. Nitric acid is metered into the decomposition reactor 1102 which is preferably set to a temperature of less than 600° C. to produce a gaseous mixture of $NO_2$, $H_2O$ and $O_2$. The carrier gas, as illustrated, is preferably nitrogen. The $NO_2$ so produced is then preferably stored in the $NO_2$ accumulator 1104. From this point the output gas stream from the $NO_2$ accumulator split and can follow one of two lines or pathways. First pathway 1106 introduces the gas stream containing the $NO_2$ and $O_2$ into the $NO_2$ reduction reactor 1108 which is preferably at a temperature of 600° C. which temperature will preferably maximize the production and yield of NO. The NO so produced may then proceed to a NO accumulator 1110 which then may be metered into the exhaust test system. Second line or pathway 1108 allows for introduction of $NO_2$ through a mass flow controller and into the exhaust test system. The described system therefore allows for the separate transient control of NO and $NO_2$ and therefore the NO2/NOx ratio within the exhaust test system exhaust stream while only relying upon a single NOx precursor. Preferably, one may therefor inject $NO_2$ into the exhaust test system at a rate of 0.1 liters/minute to 40.0 liters/minute and/or inject NO into the exhaust test system at a rate of 0.1 liters/minute to 40.0 liters/minute.

What is claimed is:

1. A burner-based exhaust test system having an exhaust line that carries an exhaust as an output of the test system, comprising:
    a decomposition reactor operable to receive a fluid that decomposes to generate $NO_2$ including a decomposition reactor output line that splits into a first and second line and at least one of the first and second lines include a mass flow measurement device and at least one of the first and second lines include a flow regulating valve;
    wherein at least one of the first and second lines is an open exhaust line and at least one of the lines is in communication with the burner-based exhaust test system; and
    wherein the mass flow measurement device and the flow regulating valve operate to alter an injection rate of $NO_2$ into said burner-based exhaust test system.

2. The burner-based exhaust test system of claim 1 wherein the fluid is nitric acid.

3. The burner-based exhaust test system of claim 1 wherein the exhaust test system is in communication with a mass flow controller which mass flow controller is in communication with a source of nitromethane or nitroethane.

4. The burner-based exhaust test system of claim 1 wherein an exhaust aftertreatment device is installed on the output exhaust line of said burner-based exhaust test system and wherein the generated $NO_2$ is introduced into said exhaust aftertreatment device.

5. The burner-based exhaust test system of claim 1 wherein the injection rate of $NO_2$ is in the range of 0.1 liters/minute to 40.0 liters/minute.

6. A method of using a burner-based exhaust test system having an exhaust line that carries an exhaust as an output of the test system, comprising:
    providing a decomposition reactor operable to receive a fluid that decomposes to generate $NO_2$ including a decomposition reactor output line that splits into a first and second line and at least one of the first and second lines include a mass flow measurement device and at least one of the first and second lines include a flow regulating valve;
    wherein at least one of the first and second lines is an open exhaust line and at least one of the lines is in communication with the burner-based exhaust test system;
    injecting $NO_2$ into said burner-based exhaust test system at a selected injection rate; and
    wherein said burner-based exhaust test system is in communication with nitromethane or nitroethane that combusts in said burner based exhaust test system to provide NO.

7. The method of claim 6 wherein the fluid is nitric acid.

8. The method of claim 6 wherein an exhaust aftertreatment device is installed on the output exhaust line of said burner-based exhaust test system and wherein the generated $NO_2$ is introduced into said exhaust aftertreatment device.

9. The method of claim 6 wherein the injection rate of $NO_2$ is in the range of 0.1 liters/minute to 40.0 liters/minute.

* * * * *